(12) United States Patent
Hishida et al.

(10) Patent No.: US 11,981,428 B2
(45) Date of Patent: May 14, 2024

(54) UNMANNED AERIAL VEHICLE WITH SUCTION DEVICE MOUNTABLE TO A WALL SURFACE

(71) Applicant: HISHIDA R&D Co., Ltd., Sakai (JP)

(72) Inventors: Satoshi Hishida, Sakai (JP); Toshihiko Shimizu, Kobe (JP); Masahiro Kakimoto, Kobe (JP)

(73) Assignee: HISHIDA R&D Co., Ltd., Sakai (JP)

( * ) Notice: Subject to any disclaimer, the term of this patent is extended or adjusted under 35 U.S.C. 154(b) by 224 days.

(21) Appl. No.: 17/385,448

(22) Filed: Jul. 26, 2021

(65) Prior Publication Data

US 2021/0347476 A1 Nov. 11, 2021

Related U.S. Application Data

(63) Continuation of application No. PCT/JP2020/006656, filed on Feb. 20, 2020.

(30) Foreign Application Priority Data

Mar. 6, 2019 (JP) ................................. 2019-040084

(51) Int. Cl.
*B64C 39/02* (2023.01)
*B64U 10/13* (2023.01)
*B64U 70/00* (2023.01)

(52) U.S. Cl.
CPC ............ *B64C 39/024* (2013.01); *B64U 10/13* (2023.01); *B64U 70/00* (2023.01); *B64U 2201/10* (2023.01)

(58) Field of Classification Search
CPC ...... B64C 39/024; B64U 10/13; B64U 70/00; B64U 2201/10

(Continued)

(56) References Cited

U.S. PATENT DOCUMENTS

2016/0016652 A1* 1/2016 Barrett .................... B64C 25/06
244/15
2016/0041628 A1* 2/2016 Verma .................... G06F 3/0304
345/156

(Continued)

FOREIGN PATENT DOCUMENTS

CN 105667779 A 6/2016
CN 107428414 A 12/2017

(Continued)

OTHER PUBLICATIONS

Office Action of the corresponding CN application No. 202080018957.2 dated Jul. 27, 2023 and English translation thereof.

*Primary Examiner* — Brady W Frazier
(74) *Attorney, Agent, or Firm* — Muncy, Geissler, Olds & Lowe, P.C.

(57) ABSTRACT

An unmanned aerial vehicle includes a main unit having a thrust generating part for flying in air, a suction device that has a suction part and is fixed to the main unit, and a control device that controls operations of the thrust generating part and the suction device such that the suction part is configured to be suctioned to a wall surface by the operation of the suction device to allow the main unit to be attached to the wall surface, wherein a suction state detecting part that detects a suction state of the suction part, is provided, and the control device controls the operation of the thrust generating part based on a detection by the suction state detecting part in suction phase and/or departure phase of the main unit with respect to the wall surface.

16 Claims, 6 Drawing Sheets

(58) Field of Classification Search
USPC .................................................... 244/17.13
See application file for complete search history.

(56) References Cited

U.S. PATENT DOCUMENTS

| | | | |
|---|---|---|---|
| 2016/0378105 A1 | 12/2016 | Tanigawa | |
| 2017/0197719 A1* | 7/2017 | Kwon | B64C 39/024 |
| 2017/0369166 A1 | 12/2017 | Van Den Heuvel | |
| 2018/0149947 A1* | 5/2018 | Kim | G05D 1/0038 |
| 2018/0251212 A1* | 9/2018 | Sugaki | B64C 25/34 |
| 2018/0265192 A1 | 9/2018 | Yamagami et al. | |
| 2019/0049971 A1* | 2/2019 | Tanaka | B64C 39/024 |
| 2019/0323866 A1* | 10/2019 | Heafitz | G01D 21/00 |
| 2020/0116128 A1* | 4/2020 | Pedersen | F03D 17/00 |
| 2022/0063038 A1* | 3/2022 | Monsarrat | B64C 39/024 |

FOREIGN PATENT DOCUMENTS

| | | | | |
|---|---|---|---|---|
| JP | 2015-101168 A | 6/2015 | | |
| JP | 2018-149973 A | 9/2018 | | |
| KR | 102019634 B1 * | 9/2019 | ........... | B64C 39/024 |

* cited by examiner

UNMANNED AERIAL VEHICLE WITH SUCTION DEVICE MOUNTABLE TO A WALL SURFACE

TECHNICAL FIELD

This invention relates to an unmanned aerial vehicle, and to be more detailed, an unmanned aerial vehicle that is suctioned to a wall surface.

BACKGROUND

Known as a conventional unmanned aerial vehicle that can be suctioned to a wall surface is a suction drone aerial vehicle disclosed in Patent Document 1. This drone aerial vehicle is provided with an aerial vehicle main unit having propellers, and a vacuum suction device having a suction part, and can perform a prescribed work by stopping the rotations of the propellers when the suction part is suctioned to a suction target. The suction part has a pressure sensor installed, and the rotation speed of a suction fan provided to the vacuum suction device is controlled based on a value measured by the pressure sensor.

PRIOR ART DOCUMENT(S)

Patent Document(s)

Patent Doc. 1: JP Laid Open Patent Application Publication 2017-193330

SUMMARY OF THE INVENTION

Problem(s) to be Solved

Although it is relatively easy for vacuum suction of an unmanned aerial vehicle onto a wall surface to maintain its suction force stably in a stationary state during the suction, in an approach phase when transitioning from a flying state to the stationary state and in a departure (or breakaway) phase when transitioning from the stationary state to the flying state, the operation and attitude of the unmanned aerial vehicle can easily become unstable, potentially causing a collision with the wall surface or a crash.

In the conventional suction drone mentioned above, although its suction force is maintained by controlling the rotation speed of a suction fan based on a detection by the pressure sensor, the issues of the approach and departure phases with the wall surface are not sufficiently investigated, and there was room for improvement in this respect.

Then, this invention has an objective of offering an unmanned aerial vehicle that can easily and securely perform suction and/or departure with a wall surface.

Means for Solving the Problem(s)

The purpose of the invention is achieved by an unmanned aerial vehicle comprising: a main unit having a thrust generating part for flying in air, a suction device that has a suction part and is fixed to the main unit, and a control device that controls operations of the thrust generating part and the suction device such that the suction part is configured to be suctioned to a wall surface by the operation of the suction device to allow the main unit to be attached to the wall surface, wherein a suction state detecting part that detects a suction state of the suction part, is provided, and the control device controls the operation of the thrust generating part based on a detection by the suction state detecting part in suction phase and/or departure phase of the main unit with respect to the wall surface. With the unmanned aerial vehicle, it is preferred that the suction device is a vacuum suction device that is configured to stick to the wall surface by vacuum suction, and the suction state detecting part is a pressure sensor that detects pressure inside the suction part.

With the unmanned aerial vehicle, when the main unit approaches the wall surface while flying by the operation of the thrust generating part, it is preferred that the control device detects with the suction state detecting part the suction to the wall surface by the operation of the suction device, and stops the thrust generating part. Also, it is preferred that the unmanned aerial vehicle comprises a wall surface detecting sensor that detects that the main unit has approached the wall surface, and that the control device starts the operation of the suction device based on the detection by the wall surface detecting sensor. It is preferred that the wall surface detecting sensor is provided with multiple distance sensors that detect distances from the wall surface.

With the unmanned aerial vehicle, when the unmanned aerial vehicle is hovering by the operation of the thrust generating part while suctioned to the wall surface by the operation of the suction device, it is preferred that the control device stops the suction device, and, after detecting a suction release from the wall surface by the suction state detecting part, operates the thrust generating part such that the main unit departs (or leaves) from the wall surface. With the structure, it is preferred that a contact force sensor that detects a contact force of the main unit to the wall surface is provided and, after detecting with the contact force sensor that the main unit has become capable of departure, the control device stops the suction device and causes the main unit to depart from the wall surface.

It is preferred that a suction and/or departure of the main unit with respect to the wall surface is performed by the thrust generating part causing the main unit to fly horizontally.

It is preferred that, once the suction state detecting part detects a suction release during a suction to the wall surface by the operation of the suction device, the control device operates the thrust generating part to maintain an attitude of the main unit.

In a state suctioned to the wall surface, the above-mentioned main unit can support a string body to which a moved body is attached, and can move the moved body by winding up the string body using a winding machine. The moved body can have a configuration provided with multiple blowers, and can maintain the moved body in a prescribed attitude by controlling the operation of the blowers. Alternatively, the moved body can be configured movable along a wall surface.

Advantage(s) of the Invention

This invention offers an unmanned aerial vehicle that can easily and securely perform suction and/or departure with a wall surface.

EMBODIMENTS OF THE INVENTION

Figure 1:
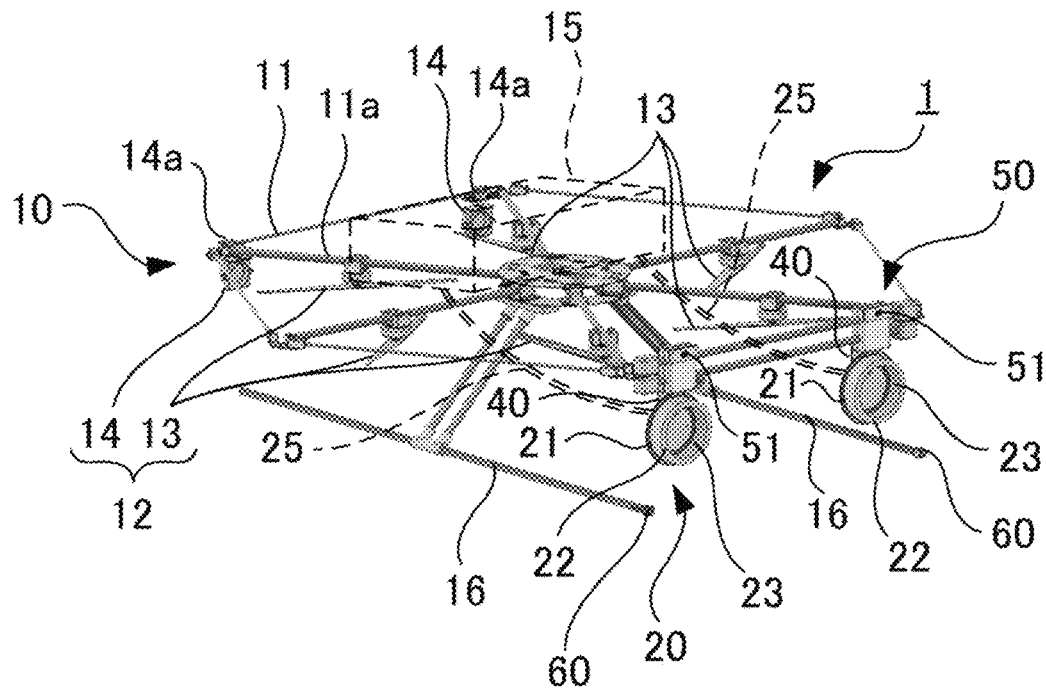
FIG. 1 is a perspective view of an unmanned aerial vehicle of an embodiment of this invention.

Below, embodiments of this invention are explained referring to attached drawings. FIG. 1 is a perspective view of an unmanned aerial vehicle of an embodiment of this invention. As shown in FIG. 1, the unmanned aerial vehicle 1 is provided with a main unit 10 and a vacuum suction device 20.

The main unit 10 is configured by having a thrust generating part 12, a chassis 15, and leg parts 16 attached to a frame 11. The frame 11 is configured by connecting the tips of arms 11a extending radially from the center into a regular hexagonal shape in a planar view.

The thrust generating part 12 is provided with multiple propellers 13 attached to the individual arms 11a of the frame 11, and ducted fans 14 attached to both the right and left sides of the back part of the frame 11. Although the number of the propellers 13 is set to 6 in this embodiment, it is not particularly limited as far as they can generate a flying thrust in an arbitrary direction, and can be 3, 4, or 8 for example. The propellers 13 are disposed so that their rotation axes become vertical when the main unit 10 is horizontal.

Each ducted fan 14 is configured with blades inside a cylindrical duct, and disposed so that its rotation axis becomes horizontal when the main unit 10 is horizontal, thereby enabling the main unit 10 to fly horizontally in a hovering state by the operation of the propellers 13. Each ducted fan 14 is supported rotatably around an axis intersecting perpendicularly with its rotation axis by a direction changing device 14a comprising a servo motor, and can allow flying forward or backward by controlling the direction of its exhaust port.

Other than a control device provided with a CPU, memory, and the like, the chassis 15 is provided with necessary functions for an operator to operate the unmanned aerial vehicle, such as a communication device, a GPS antenna, an acceleration sensor, and a battery, and is fixed to the upper part of the frame 11. In order to facilitate understanding the configuration of the unmanned aerial vehicle 1, the chassis 15 is shown in broken lines in FIG. 1.

The leg parts 16 are bar-shaped members supported extending parallel to each other on the right and left sides under the frame 11, and support the unmanned aerial vehicle 1 in a touchdown phase.

The vacuum suction device 20 is provided with suction parts 21 and a vacuum pump connected to the suction parts 21. Each of the suction parts 21 is made of an elastic material such as resin or rubber, and has a suction hole 23 formed in the center of an suction surface 22 that can be suctioned to a wall surface. The suction parts 21 are installed on the right and left sides of the front part of the frame 11, respectively, and are disposed so that the suction surfaces 22 face forward. The vacuum pump is accommodated inside the chassis 15 and branch-connected to the suction parts 21 through pipes 25 shown in broken lines. Although two suction parts 21 are installed in this embodiment, as long as it can be securely suctioned to the wall surface, just one can do, or three or more can be installed as appropriate considering a necessary suction force, the situation of the suction place, etc.

Also, the unmanned aerial vehicle 1 is provided with pressure sensors 40, a wall surface detecting sensor 50, and contact force sensors 60. Each of the pressure sensors 40, for example, comprises a diaphragm gauge, is attached to one of the suction parts 21 so as to face suction hole 23, and detects pressure inside each of the suction parts 21.

The wall surface detecting sensor 50 is a sensor that detects that the unmanned aerial vehicle 1 has approached the wall surface, and is provided with multiple distance sensors 51 attached above the respective suction parts 21 in the right and left sides of the front part of the frame 11. Each of the distance sensors 51, for example, comprises an ultrasonic sensor, an infrared sensor, a laser sensor, or the like, is disposed somewhat behind the respective suction surface 22 so as not obstruct the suction of the suction surface 22 to the wall surface, and detects the distance to the wall surface approaching the front of the suction surface 22.

Each of the contact force sensors 60, for example, comprises a piezoelectric element and is attached to the front part of the respective right or left leg part 16 so as to contact the wall surface and detect a contact force when the unmanned aerial vehicle 1 is suctioned to the wall surface. Dispositions of the contact force sensors 60 and the leg parts 16 are not particularly limited, and for example, only one bar-shaped leg part 16 may be installed in the center of the frame 11 so as not to obstruct the thrust of the thrust generating part 12, and the contact force sensor 60 can be attached to the tip of this leg part 16.

Figure 2:
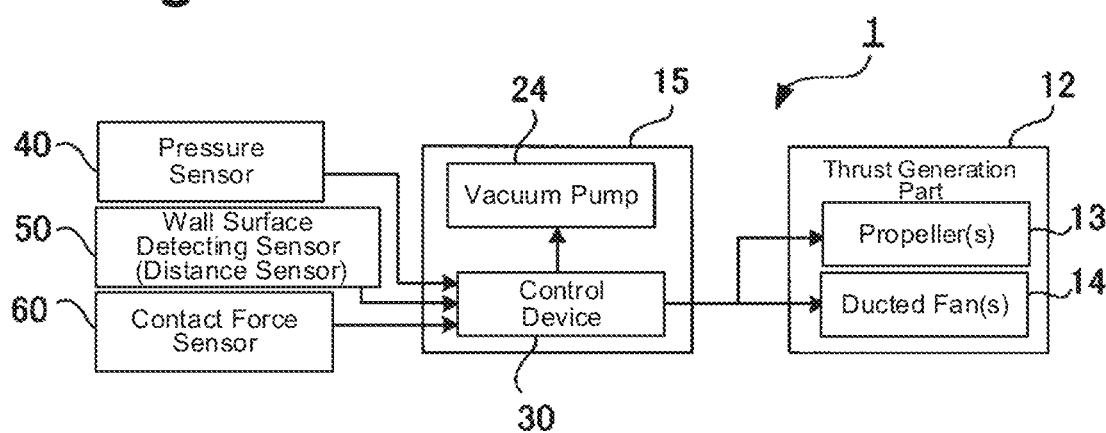
FIG. 2 is a block diagram showing the functional configuration of the unmanned aerial vehicle shown in FIG. 1.

FIG. 2 is a block diagram showing the functional configuration of the unmanned aerial vehicle shown in FIG. 1. As shown in FIGS. 1 and 2, in the suction or departure phase of the main unit 10 with the wall surface, upon receiving input signals from the pressure sensors 40, the wall surface detecting sensor 50, and the contact force sensors 60, the control device 30 accommodated inside the chassis 15 controls the operation of the vacuum pump 24 of the vacuum suction device 20 and also controls the operations of the propellers 13 and the ducted fans 14 of the thrust generating part 12.

Figure 3A:
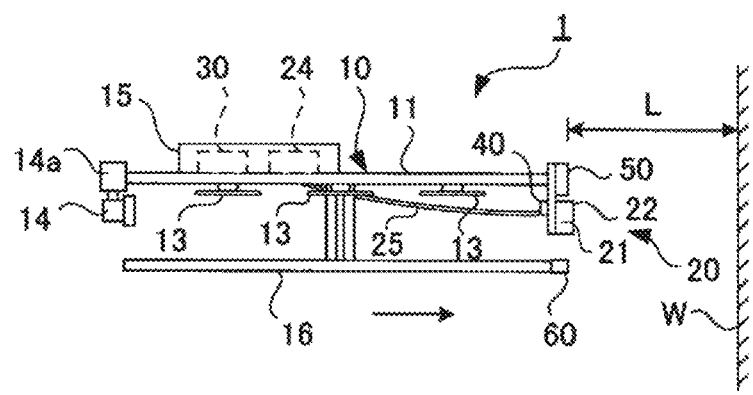
FIGS. 3A to 3C are side views for explaining the operation of the unmanned aerial vehicle shown in FIG. 1 in a suction phase with a wall surface.

Next, explained is the operation of the unmanned aerial vehicle 1 provided with the configuration mentioned above. In the suction phase of the unmanned aerial vehicle 1 with the wall surface, by a manual operation by the operator using a transmitter or an automatic operation, as shown in FIG. 3A, the unmanned aerial vehicle 1 is caused to fly to the vicinity of the wall surface W extending vertically. Once the wall surface detecting sensor 50 detects that the distance to the wall surface W has become a prescribed distance L or less, the control device 30 starts the operation of the vacuum pump 24, and operates the ducted fans 14 while operating the propellers 13 in a hovering state (stalled in air) to cause the main unit 10 to fly horizontally as indicated with an arrow toward the wall surface W. Although the flying velocity of the main unit 10 in the suction phase with the wall surface can be made constant, it can be controlled to decrease gradually as the distance to the wall surface W detected by the wall surface detecting sensor 50 decreases.

Because the wall surface detecting sensor 50 of this embodiment is provided with the distance sensors 51 in both the right and left sides of the front part of the main unit 10, respectively, by controlling the operations of the right and left ducted fans 14 so that the distances to the wall surface W from the distance sensors 51 become equal to each other, their suction surfaces 22 can be made approximately parallel to the wall surface W and securely suctioned to it. The attaching positions of the distance sensors 51 are not necessarily limited to the front part of the main unit 10 but can be the back part of the main unit 10 for example. Also, in flying horizontally, other sensors such as atmospheric pressure sensors than the distance sensors 51 can be utilized.

Figure 3B:
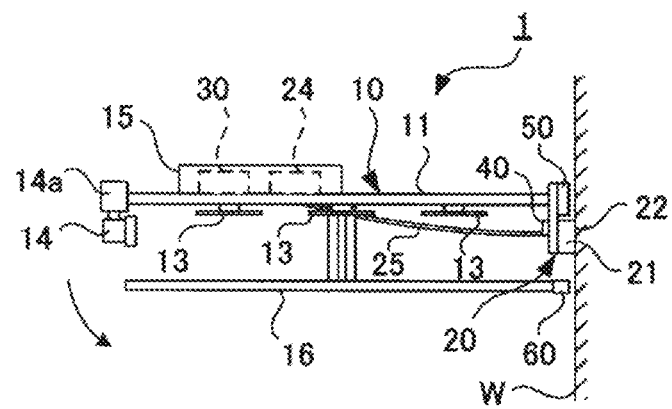
Figure 3C:
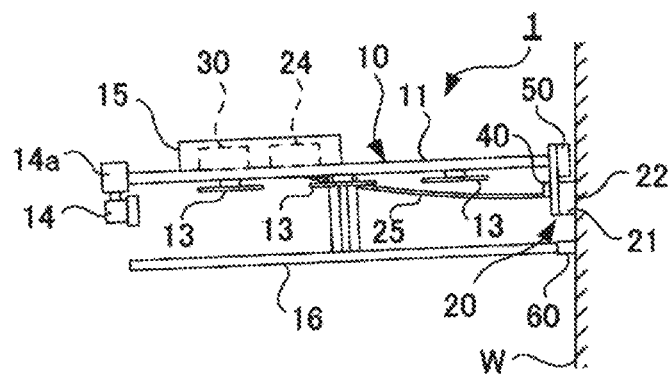

As shown in FIG. 3B, once the suction surfaces 22 of the suction parts 21 contact tightly with the wall surface W, the suction parts 21 are vacuum suctioned by the vacuum pump 24 and have their interiors depressurized. Once the pressure sensors 40 detect that the interiors of the suction parts 21 have reached a prescribed negatively pressure, the control device 30 judges that the suction of the main unit 10 to the wall surface is complete W, and stops the propellers 13 and the ducted fans 14. Thereby, the unmanned aerial vehicle 1 inclines in a direction indicated with an arrow by its own weight, and the contact force sensors 60 contact the wall surface W as shown in FIG. 3C. The detection of the suction completion by the control device 30 can be performed by also utilizing, in addition to the detections by the pressure sensors 40 mentioned above, distance values to the wall surface W detected by the distance sensors 51, time that passed since the pressure sensors 40 detected depressurization, etc. as appropriate While the unmanned aerial vehicle 1 is suctioned to the wall surface W by the operation of the vacuum pump 24, various work devices (not shown) such as an inspection device, a water sprinkling device, a drug spraying device, and a coating device onboard the unmanned aerial vehicle 1 can be operated to perform prescribed works to the wall surface W or its vicinity. The pressure sensors 40 constantly monitor the pressures inside the suction parts 21 while they are suctioned to the wall surface W, and if any of the pressure sensors 40 detects a prescribed amount of decline in the negative pressure (a pressure change toward the atmospheric pressure), the control device 30 operates the propellers 13 so that the main unit 10 performs hovering or slow descent to maintain the attitude of the main unit 10. In this manner, falling of the unmanned aerial vehicle 1 while it is suctioned can be securely prevented. At this time, the control device 30 can send an abnormality signal indicating that the propellers 13 have been emergency-operated to the operator's transmitter or the like.

Figure 4A:
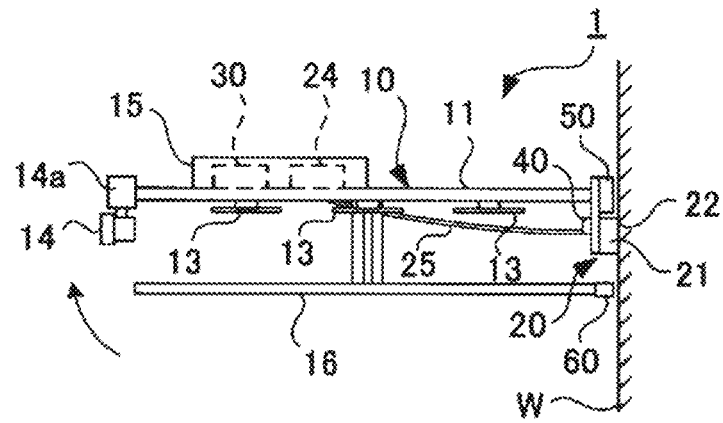
FIGS. 4A and 4B are side views for explaining the operation of the unmanned aerial vehicle shown in FIG. 1 in a departure phase with a wall surface.

In the departure phase of the unmanned aerial vehicle 1 with the wall surface W, as shown in FIG. 4A, by receiving a departure signal from the transmitter, a work device, or the like, the control device 30 operates the propellers 13 to perform hovering while maintaining the suctioned state by the operation of the vacuum pump 24, and also operates the direction changing device 14a to make the orientation of the ducted fans 14 allow flying backwards. Because the attitude of the main unit 10 becomes horizontal by hovering, the contact force sensors 60 leave the wall surface W, thereby values detected by the contact force sensors 60 decline. Upon detecting that the values detected by the contact force sensors 60 have become a prescribed value or lower, the control device 30 judges that the main unit 10 has become capable of departure, and stops the operation of the vacuum pump 24. The hovering by the operation of the propellers 13 can be performed by the operator instead of the control device 30.

Figure 4B:
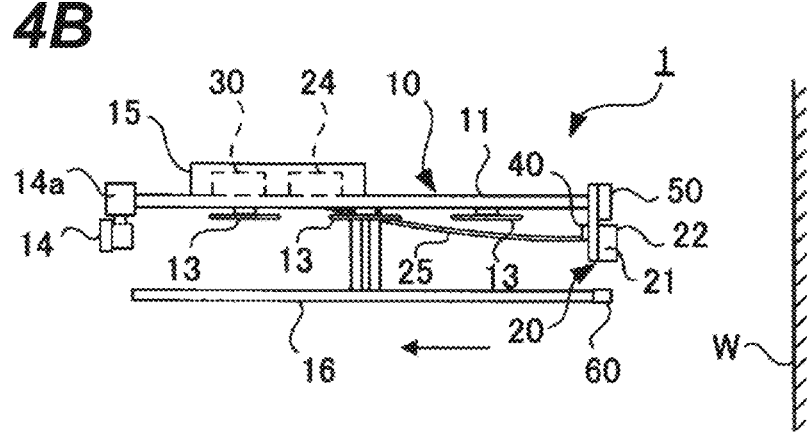

Then, after the prescribed negative pressure decline inside suction parts 21 is detected by either of the pressure sensors 40, the ducted fans 14 are operated, and as shown in FIG. 4B, the main unit 10 is caused to fly horizontally in the arrow direction, and the unmanned aerial vehicle 1 can be caused to depart from the wall surface W. In order to perform the negative pressure decline of the suction parts 21 quickly, an exhaust valve can also be installed on each of the suction parts 21, and the exhaust valves can be operated when the vacuum pump 24 is stopped to expose the interiors of the suction parts 21 to the atmosphere.

In this manner, the unmanned aerial vehicle 1 of this embodiment is configured so as to stop the operations of the propellers 13 and the ducted fans 14 after detecting the completion of suction to the wall surface W by the pressure sensors 40 in the suction phase with the wall surface W, and start the operation of the ducted fans 14 after detecting the release of suction to the wall surface W in the departure phase with the wall surface W. Therefore, the attitude of the unmanned aerial vehicle 1 can be prevented from becoming unstable, thereby suction and departure with the wall surface can be performed easily and securely.

Also, in the suction phase with the wall surface W, because the operation of the vacuum suction device 20 is started based on the detections by the distance sensors 51 constituting the wall surface detecting sensor 50, the suction of the unmanned aerial vehicle 1 can be more securely performed. The distance sensors 51 can be installed on the back part, the left and right, and/or the top and bottom other than the front part to prevent collisions by keeping distances from/with surrounding objects. The distance sensors 51 can be a single range sensor that can measure distances to arbitrary multiple ranging points by a two- or three-dimensional scan.

On the other hand, this embodiment is configured so that in the departure phase with the wall surface W, the propellers 13 are operated to cause the unmanned aerial vehicle 1 to hover while suctioned to the wall surface W by the operation of the vacuum suction device 20, and after the contact force sensors 60 detected that departure from the wall surface W was enabled, the control device 30 stops the vacuum suction device 20 to cause the main unit 10 to depart from the wall surface. Therefore, the departure of the unmanned aerial vehicle 1 can be performed safely and smoothly.

Although an embodiment of this invention was described in detail above, specific modes of this invention are not limited to the above-mentioned embodiment. For example, although this embodiment is given a configuration that the wall surface detecting sensor 50 to detect that the main unit 10 has approached the wall surface W is provided with multiple distance sensors 51, they are not limited to sensors that can measure the distances to the wall surface but can be cameras or infrared sensors to detect that the wall surface W exists within prescribed regions. If cameras are used as the wall surface detecting sensor 50, by continuing imaging even after the suction to the wall surface W, the suction state can be checked. The wall surface detecting sensor 50 is not indispensable in this invention, but the operator or the like can visually confirm that the unmanned aerial vehicle 1 has approached the wall surface W and manually operate the vacuum suction device 20 by operating the transmitter.

Also, although the unmanned aerial vehicle 1 of this embodiment has a configuration that the thrust generating part 12 is provided with the multiple propellers 13 and the multiple ducted fans 14, the multiple propellers 13 can be disposed so that their rotation axes are inclined relative to the horizontal main unit 10, thereby without installing the ducted fans 14 the main unit 10 can be caused to fly horizontally as it is in a horizontal attitude and perform suction and/or departure with the wall surface W. The inclinations of the rotation axes of the propellers 13 can be realized by a tilting mechanism that allows their angle adjustments.

Also, although the suction parts 21 are fixed to the main unit 10 in this embodiment, they can be rotatably attached to the main unit 10 through universal joints or the like, thereby even when a deviation in the suction direction to the wall surface occurs, this deviation can be suctioned by the rotations of the suction parts 21.

In performing various works utilizing the unmanned aerial vehicle 1, as in this embodiment, the work devices can be fixed to the main unit 10, and the unmanned aerial vehicle 1 can be moved to a desired position and suctioned to the wall surface W, thereby the work devices can perform prescribed works in the suction position. Alternatively, adoptable is a configuration where the main unit 10 supports a string body to which a moved body is attached in a state suctioned to the wall surface W and moves the moved body by winding up the string body with a winding machine, allowing various works to be performed by the work devices provided to the moved body.

Figure 5:
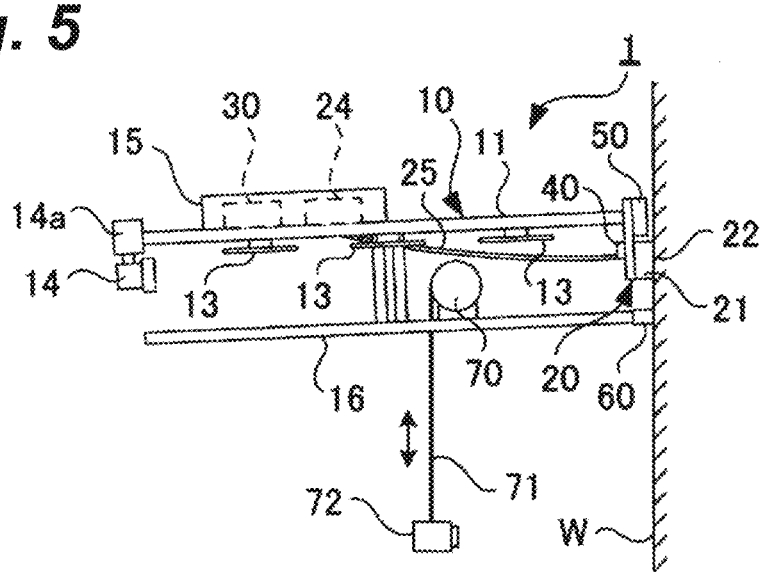
FIG. 5 is a side view of an unmanned aerial vehicle of another embodiment of this invention.

For example, as shown in FIG. 5, adoptable is a configuration where a winding machine 70 is fixed to the main unit 10, and a moved body 72 is attached to the tip of a string body 71 such as a wire rope that is wound up by the winding machine 70. By this configuration, the unmanned aerial vehicle 1 can be suctioned to the wall surface W, and the winding machine 70 can wind the string body 71 up or down, thereby moving the moved body 72 to perform various works (e.g., inspecting or coating the wall surface W). The movement of the moved body 72 is not necessarily limited to the vertical direction immediately under the winding machine 70, but the string body 71 can be made sufficiently long to drag the moved body 72 along the ground surface (or simply a level of ground), water surface, or the like.

Figure 6:
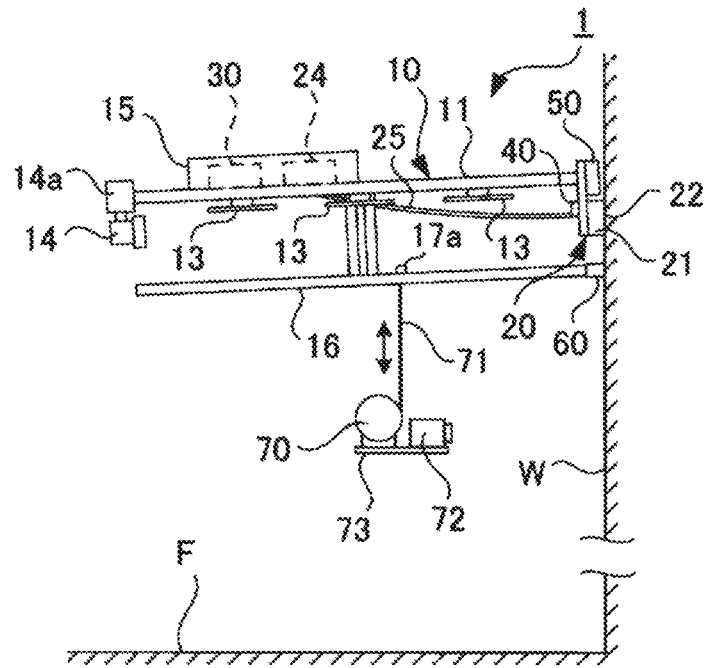
FIG. 6 is a side view of an unmanned aerial vehicle of yet another embodiment of this invention.
Figure 7:
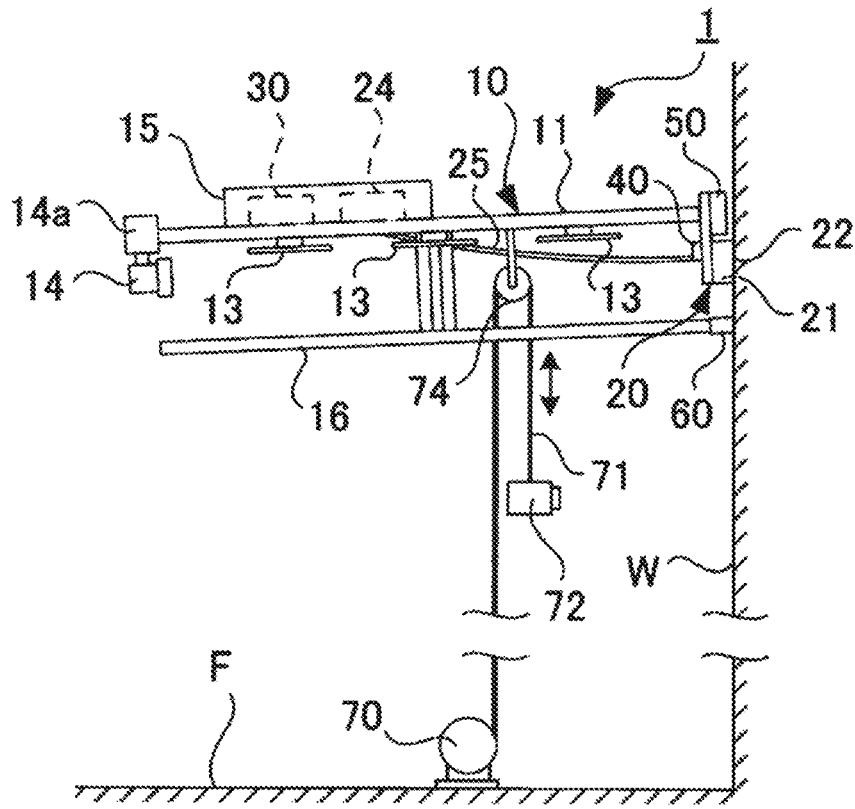
FIG. 7 is a side view of an unmanned aerial vehicle of yet another embodiment of this invention.

Supporting the string body 72 by the main unit 10 can be realized by configurations shown in FIGS. 6 and 7 other than the configuration shown in FIG. 5. The configuration shown in FIG. 6 is a configuration where one end of the string body 71 is attached to the main unit 10 to allow the other end of the string body 71 to be wound up or down by the winding machine 72. In this configuration, by fixing the moved body 72 together with the winding machine 70 to a base plate 73 or the like, the moved body 72 can be moved by the operation of the winding machine 70. The configuration shown in FIG. 7 is a configuration where a pulley 74 is installed on the main unit 10, the moved body 72 is attached to one end of the string body 71 hung on the pulley 74, and the other end of the string body 71 is wound up or down by the winding machine 70 installed on the ground surface F, thereby the moved body 72 can be moved.

Although the unmanned aerial vehicle 1 in the embodiments mentioned above is configured so that the operation of the thrust generating part 12 is controlled based on the detections by the pressure sensors 40 in both the suction and departure phases of the main unit 10 with the wall surface W, it can be configured so that the operation control of the thrust generating part 12 based on the detections by the pressure sensors 40 is performed in only one of the suction and departure phases. The wall surface W to which the unmanned aerial vehicle 1 is suctioned is not necessarily limited to a wall surface extending vertically but can be an inclined surface or a ceiling surface by arranging the suction parts 21 so as to allow approach or departure perpendicularly with a desired wall surface.

Although the unmanned aerial vehicle 1 of the embodiments mentioned above uses the vacuum suction device 20 as a suction device for sticking/attaching to the main unit 10 to the wall surface, another suction device can be used that operates utilizing another suction technique (such as claws, adhesion, electromagnets, electrostatic suction/adsorption, or a molecular force) than vacuum suction so as to perform adsorption and adsorption release with the wall surface. Also, although the pressure sensors 40 are used as adsorption state detecting parts that detect the adsorption states of the suction parts 21, if another adsorption device than the vacuum suction device 20 is used, various sensors corresponding to the suction technique of the suction device can be used as the suction state detecting parts.

Figure 8:
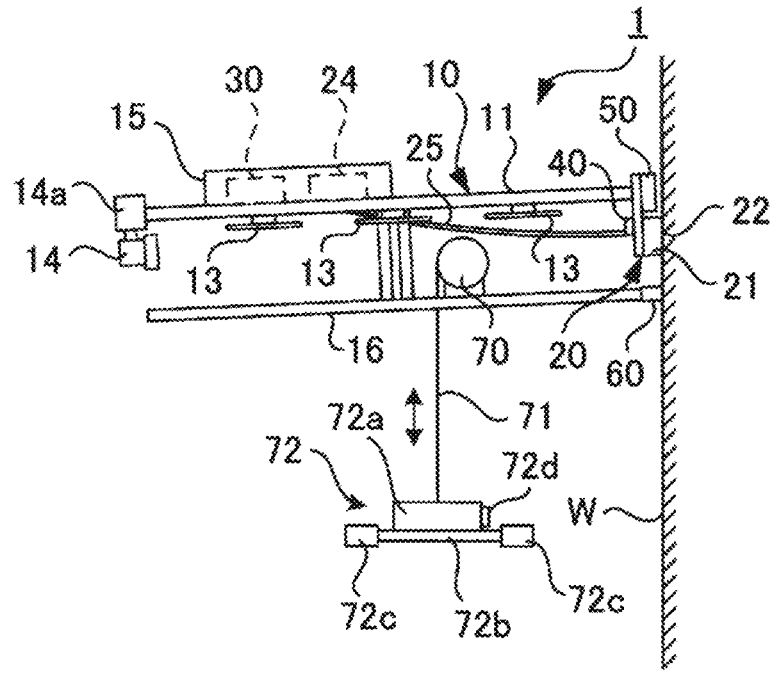
FIG. 8 is a side view of an unmanned aerial vehicle of yet another embodiment of this invention.

The moved body 72 shown in FIGS. 5-7 can be configured so that its attitude can be stabilized in a state suspended by the string body 71. FIG. 8 is a side view showing an example of the unmanned aerial vehicle 1 provided with such a moved body 72. The moved body 72 shown in FIG. 8 is configured by attaching blowers 72c to four corners of a rectangular-shaped base plate 72b that supports a chassis-shaped moved body main unit 72a, respectively. The blowers 72c comprise various fans such as ducted fans and are disposed so that the rotation axes of the fans are oriented vertically. Accommodated in the moved body main unit 72a are, other than an attitude detecting sensor such as a gyro sensor that detects the attitude of the moved body 72 and a control device that controls the attitude of the moved body 72, an inspection device 72d such as an imaging camera or an ultrasound diagnostic device to inspect the wall surface W, etc. As the blowers 72c, multiple of them can be disposed as appropriate according to the size and shape of the moved body 72, and as far as they can control the attitude of the moved body 72, their orientations are not particularly limited.

If the moved body 72 suspension-supported/by the string body 71 swings by wind, vibration, or the like, the unmanned aerial vehicle 1 shown in FIG. 8 can detect the attitude of the moved body 72 in the moved body main unit 72a and control the operation of the blowers 72c, thereby maintaining the moved body 72 in the prescribed attitude such as a horizontal attitude, which allows performing a quick and precise inspection of the wall surface W or the like by the inspection device 72d. On the moved body main part 72a, work devices that perform various works (e.g., core removal, welding, laser blasting, etc.) to the wall surface W can be installed, and in this case also the works can be performed quickly and precisely. The blowers 72c, the inspection device 72d, and the work devices can be provided with power through the string body 71 from a power supply, a generator, or the like (not shown) built in the main unit 10 of the unmanned aerial vehicle 1, which allows weight reduction of the moved body 72, and can also support works requiring large power.

Figure 9:
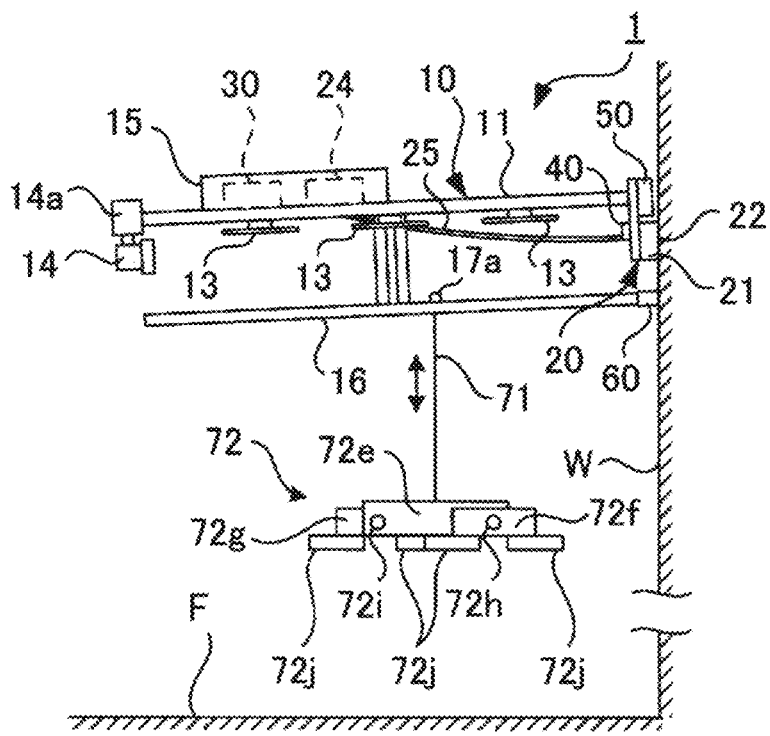
FIG. 9 is a side view of an unmanned aerial vehicle of yet another embodiment of this invention.

Also, the moved body 72 can be configured movable along the wall surface. FIG. 9 is a side view showing an example of the unmanned aerial vehicle 1 provided with such a moved body 72. The moved body 72 shown in FIG. 9 is provided with a pair of leg parts 72f and 72g on both sides of a chassis-shaped moved body main unit 72e, respectively. The pair of leg parts 72f and 72g are each provided with a vacuum suction pad 72j and supported rotatably to the moved body main unit 72e by rotation shafts 72h and 72i, respectively. Accommodated in the moved body main unit 72a are motors to rotate the pair of leg parts 72f and 72g, pressure sensors to detect that the leg part 72f or 72g contacted the ground surface F or the wall surface W, a control device to control the operations of the vacuum suction pads 72j and the motors, etc.

The unmanned aerial vehicle 1 shown in FIG. 9 can move the moved body 72 along the ground surface F and the wall surface W erected from the ground surface F by feeding out the string body 71 and causing the moved body 72 to touch down the ground surface F.

Figure 10A:
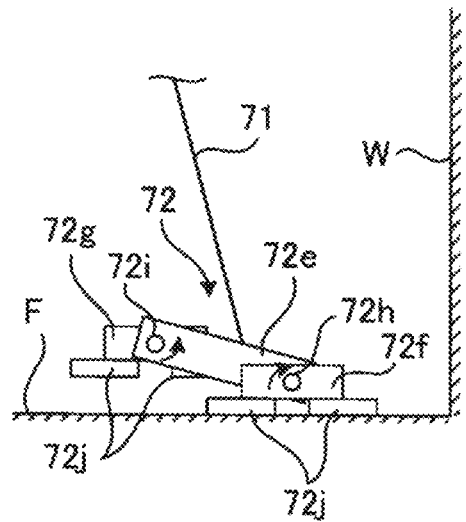
FIGS. 10A to 10C are main part side views for explaining the operations of the unmanned aerial vehicle shown in FIG. 9.
Figure 10B:
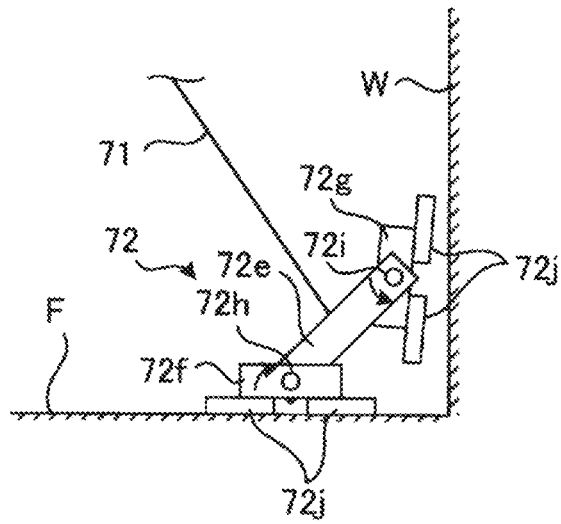
Figure 10C:
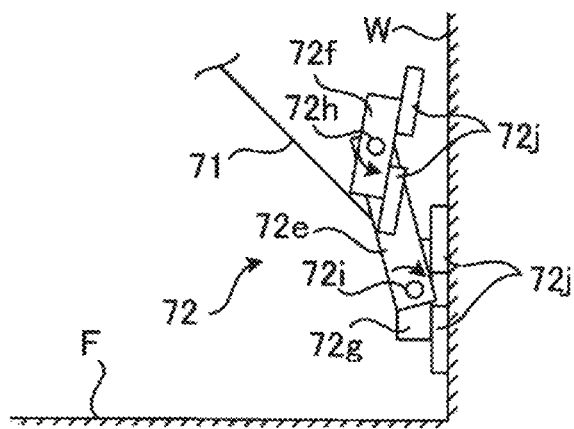

FIG. 10 shows an example of the operation that the moved body 72 shown in FIG. 9 moves along the ground surface F and the wall surface W. As shown in FIG. 10A, in a state where the vacuum suction pad 72j of one leg part 72f is suctioned to the ground surface F, and the vacuum suction pad 72j of the other leg part 72g is released from suction, if the moved body main unit 72e is rotated in an arrow direction around the rotation shaft 72h, and the other leg part 72g is rotated in an arrow direction around the rotation shaft 72i while the moved body main unit 72e is rotating, as shown in FIG. 10B, the vacuum suction pad 72j of the other leg part 72g approaches the wall surface W. Once the other leg part 72g contacts the wall surface W, in the moved body main unit 72e, the vacuum suction pad 72j of the other leg part 72g is suctioned to the wall surface W, and as shown in FIG. 10C, the moved body main unit 72e is rotated in an arrow direction around the rotation shaft 72i, and the other leg 72f is rotated around the rotation shaft 72h while the moved body main unit 72e is rotating. In this manner, the moved body 72 moving on the ground surface F can be smoothly migrated to the wall surface W. In the same manner as in the configuration shown in FIG. 8, various kinds of inspection devices and work devices can be mounted on the moved body main unit 72e, so that inspections and works can be performed while moving along the wall surface W. Listed as specific examples of the inspections and works are an imaging inspection with a camera, a hitting sound inspection with a hammer, a plate thickness inspection with a probe, etc. of the wall surfaces of tunnels, bridges, dams, buildings, electric power generating facilities, various plants, etc.

The suction of the moved body 72 to the ground surface F or the wall surface W can be performed also utilizing an electromagnet or the like instead of vacuum suction. Also, the configuration to move the moved body 72 along the ground surface F or the wall surface W is not limited to the above-mentioned configuration but can utilize, for example, wheels or caterpillars having suction parts over the whole circumferential direction, an inchworm principle, or the like.

1: Unmanned aerial vehicle
10: Main unit
12: Thrust generating part
13: Propeller
14: Ducted fan
20: Vacuum suction device (suction device)
24: Vacuum pump
21: Suction part
30: Control device
40: Pressure sensor (Suction state detecting part)
50: Wall surface detecting sensor
51: Distance sensor
60: Contact force sensor
70: Winding machine
71: String body
72: Moved body
72c: Blower
W: Wall surface

What is claimed is:

1. An unmanned aerial vehicle comprising:
    a main unit having a thrust generating part for flying in air,
    a suction device that has a suction part and is fixed to the main unit, and
    a control device that controls operations of the thrust generating part and the suction device such that the suction part is configured to be suctioned to a wall surface by the operation of the suction device to allow the main unit to be attached to the wall surface, wherein
    the unmanned aerial vehicle further comprises a suction state detecting part that detects a suction state of the suction part,
    the control device controls the operation of the thrust generating part based on a detection by the suction state detecting part during a suction phase of the main unit with respect to the wall surface,
    in a state suctioned to the wall surface, the main unit supports a string body to which a moved body is attached, and
        moves the moved body by winding up the string body with a winding machine, and
    wherein the moved body is provided with multiple blowers, and the moved body is maintained in a prescribed attitude by controlling operations of the blowers.

2. The unmanned aerial vehicle according to claim 1, wherein
    the suction device is a vacuum suction device that is configured to stick to the wall surface by vacuum suction, and
    the suction state detecting part is a pressure sensor that detects pressure inside the suction part.

3. The unmanned aerial vehicle according to claim 1, wherein
    when the main unit approaches the wall surface and the control device detects with the suction state detecting part the suction state to the wall surface by the operation of the suction device while flying by the operation of the thrust generating part,
    the control device stops the thrust generating part.

4. The unmanned aerial vehicle according to claim 1, further comprising:
    a wall surface detecting sensor that detects that the main unit has approached the wall surface, wherein
    the control device starts the operation of the suction device based on the detection by the wall surface detecting sensor.

5. The unmanned aerial vehicle according to claim 4, wherein
    the wall surface detecting sensor is further provided with multiple distance sensors that detect distances from the wall surface.

6. The unmanned aerial vehicle according to claim 5, wherein
    when the unmanned aerial vehicle is hovering by the operation of the thrust generating part while suctioned to the wall surface by the operation of the suction device,
    the control device
        stops the suction device, and after detecting a suction release from the wall surface by the suction state detecting part, operates the thrust generating part such that the main unit departs from the wall surface.

7. The unmanned aerial vehicle according to claim 6, further comprising:
a contact force sensor that detects a contact force of the main unit to the wall surface, wherein
after detecting that the contact force detected with the contact force sensor became a prescribed value or less, the control device
stops the suction device and
causes the main unit to depart from the wall surface.

8. The unmanned aerial vehicle according to claim 7, wherein
the suction state of the main unit with respect to the wall surface is performed by the thrust generating part causing the main unit to fly horizontally.

9. The unmanned aerial vehicle according to claim 1, wherein
once the suction state detecting part detects a suction release during a suction to the wall surface by the operation of the suction device, the control device operates the thrust generating part to maintain an attitude of t to main unit.

10. The unmanned aerial vehicle according to claim 1, wherein
the moved body is configured to be movable along the wall surface.

11. An unmanned aerial vehicle comprising:
a main unit having a thrust generating part for flying in air,
a suction device that has a suction part and is fixed to the main unit, and
a control device that controls operations of the thrust generating part and the suction device such that the suction part is configured to be suctioned to a wall surface by the operation of the suction device to allow the main unit to be attached to the wall surface, wherein
the unmanned aerial vehicle further comprises a suction state detecting part that detects a suction state of the suction part,
the control device controls the operation of the thrust generating part based on a detection by the suction state detecting part during a departure phase of the main unit with respect to the wall surface,
in a state suctioned to the wall surface, the main unit
supports a string body to which a moved body is attached, and
moves the moved body by winding up the string body with a winding machine, and
wherein the moved body is provided with multiple blowers, and the moved body is maintained in a prescribed attitude by controlling operations of the blowers.

12. The unmanned aerial vehicle according to claim 11, wherein
the control device further controls the operation of the thrust generating part based on another detection by the suction state detecting part during a suction phase of the main unit with respect to the wall surface.

13. The unmanned aerial vehicle according to claim 11, wherein
the suction device is a vacuum suction device that is configured to stick to the wall surface by vacuum suction, and
the suction state detecting part is a pressure sensor that detects pressure inside the suction part.

14. The unmanned aerial vehicle according to claim 11, wherein
when the main unit approaches the wall surface and the control device detects with the suction state detecting part the suction state to the wall surface by the operation of the suction device while flying by the operation of the thrust generating part, the control device stops the thrust generating part.

15. The unmanned aerial vehicle according to claim 11, further comprising:
a wall surface detecting sensor that detects that the main unit has approached the wall surface, wherein
the control device starts the operation of the suction device based on the detection by the wall surface detecting sensor.

16. The unmanned aerial vehicle according to claim 11, wherein
the moved body is configured to be movable along the wall surface.

* * * * *